United States Patent
Humphreys et al.

(10) Patent No.: US 6,718,544 B1
(45) Date of Patent: Apr. 6, 2004

(54) USER INTERFACE FOR MAKING COMPILER TRADEOFFS

(75) Inventors: Jonathan F. Humphreys, Missouri City, TX (US); Alan S. Ward, Sugarland, TX (US); Reid E. Tatge, Richmond, TX (US); David H. Bartley, Dallas, TX (US); Paul C. Fuqua, Dallas, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/510,217

(22) Filed: Feb. 22, 2000

(51) Int. Cl.[7] .................................................. G06F 9/45
(52) U.S. Cl. ...................... 717/158; 717/140; 717/151; 717/130
(58) Field of Search ................ 717/110–113, 123–128, 717/151–153, 158–159, 140, 141, 145, 130

(56) References Cited

U.S. PATENT DOCUMENTS

| 5,862,381 | A | * | 1/1999 | Advani et al. | 395/704 |
|---|---|---|---|---|---|
| 5,946,493 | A | * | 8/1999 | Hanson | 395/709 |
| 5,966,537 | A | * | 10/1999 | Ravichandran | 395/709 |
| 5,966,538 | A | * | 10/1999 | Granston et al. | 395/709 |
| 6,199,199 | B1 | * | 3/2001 | Johnston et al. | 717/4 |
| 6,205,555 | B1 | * | 3/2001 | Kageshima et al. | 713/300 |
| 6,311,324 | B1 | * | 10/2001 | Smith et al. | 717/4 |
| 6,332,212 | B1 | * | 12/2001 | Organ et al. | 717/4 |

OTHER PUBLICATIONS

"Compiler analysis: Critical step for optimazing embedded code", Electronic Engineering Times; Manhasset; Apr. 5, 1999; Jan Liband, Issue 1055, Start p. 88.*

"An infrastructure for Profile–Driven Dynamic Recompilation", Robert G. Burger, SAGIAN, A division of Beckman Coulter and R. Kent Dybvig, Computer Science Department, Indiana University. Computer Languages, 1998. pp. 240–249, May 14–16, 1998.*

* cited by examiner

Primary Examiner—Tuan Dam
Assistant Examiner—Mary Steelman
(74) Attorney, Agent, or Firm—William W. Holloway; W. James Brady; Frederick J. Telecky, Jr.

(57) ABSTRACT

A user interface that allows a user to visually understand, inspect, and manipulate a compiled application program as a function of compiler options, such as, code size and speed, is provided.

10 Claims, 5 Drawing Sheets

FIG. 3

| Function | Cycles | Size | OptionSet | Options |
|---|---|---|---|---|
| decoder_homing_fra... | 26 | 80 | Size | -o3 -oi0 -ms2 |
| rx_dtx | 99 | 900 | Minimum Size | -o3 -oi0 -ms3 |
| D_plsf_5 | 641 | 1716 | Minimum Size | -o3 -oi0 -ms3 |
| Q_plsf_5 | 744 | 1448 | Minimum Size | -o3 -oi0 -ms3 |
| decoder_reset | 296 | 368 | Minimum Size | -o3 -oi0 -ms3 |
| Int_lpc2 | 296 | 224 | Minimum Size | -o3 -oi0 -ms3 |
| Lsf_wt | 770 | 236 | Minimum Size | -o3 -oi0 -ms3 |
| main | 2919 | 1680 | Minimum Size | -o3 -oi0 -ms3 |
| reset_rx_dtx | 274 | 172 | Minimum Size | -o3 -oi0 -ms3 |
| reset_tx_dtx | 315 | 184 | Minimum Size | -o3 -oi0 -ms3 |
| Eric_lag6 | 242 | 344 | Minimum Size | -o3 -oi0 -ms3 |
| vad_reset | 506 | 184 | Size | -o3 -oi0 -ms2 |
| Int_lnc | 616 | 272 | Minimum Size | -o3 -oi0 -ms3 |

FIG. 4 gsm51.orf

Overrides

| Function | OptionSet/Rule |
|---|---|
| Init_Pre_Process | None |
| set_sign | None |
| search_10i40 | None |
| q_p | None |
| cor_h_x | None |
| cor_h | None |
| build_code | None |
| code_10i40_35bits | None |
| Coder_12k2 | None |
| Vq_subvec_s | None |
| Vq_subvec | None |
| Lsf_wt | None |
| 0_plsf_5 | None |

Rule: ○Smallest ○Fastest ○None

| | OptionSet | Cycles | Size | Options |
|---|---|---|---|---|
| ○ | Maximum Speed | 67480 | 6364 | -o3 -oi0 |
| ○ | Aggressive Speed | 67864 | 6316 | -o3 -oi0 -ms0 |
| ○ | Speed | 66380 | 6492 | -o3 -oi0 -ms1 |
| ○ | Size | 217240 | 5048 | -o3 -oi0 -ms2 |
| ○ | Minimum Speed | 292348 | 5056 | -o3 -oi0 -ms3 |

FIG. 5

Estimated:
Cycles: 414834
Size: 53024
Unprofiled Cycles: 80458
Unprofiled Size: 36388
Total Cycles: 495292
Total Size: 89412

Actual:
Cycles: 414834
Size: 53068
Unprofiled Cycles: 80532
Unprofiled Size: 36436
Total Cycles: 495366
Total Size: 89504

| Function | Estimated C ▼ | Estimated Size | OptionSet | Profiled Cycles | Profiled Size | Delta Cycle | Delta Size |
|---|---|---|---|---|---|---|---|
| search_10i40 | 66380 | 6492 | Speed | 66380 | 6516 | 0 | -24 |
| Syn_filt | 32928 | 744 | Maximum Spe... | 32928 | 744 | 0 | 0 |
| Vq_subvec | 25520 | 320 | Minimum Size | 25520 | 320 | 0 | 0 |
| Lag_max | 22404 | 708 | Maximum Spe... | 22404 | 708 | 0 | 0 |
| Vq_subvec_s | 19769 | 616 | Minimum Size | 19769 | 616 | 0 | 0 |
| Norm_Corr | 16466 | 1280 | Maximum Spe... | 16466 | 1280 | 0 | 0 |
| Coder_12k2 | 16030 | 3520 | Minimum Size | 16030 | 3520 | 0 | 0 |

USER INTERFACE FOR MAKING COMPILER TRADEOFFS

FIELD OF THE INVENTION

The present invention relates to a user interface for a compiler, and more particularly, to a user interface for making compiler tradeoffs.

BACKGROUND OF THE INVENTION

An application program may be built (compiled and linked) in a number of different ways. For example, as part of a compiler compiling an application program, different compiler options may be used and different memory maps or layouts (on chip vs off chip) may be used. For convenience herein, a specific way of building an application program (compiling and linking a program with specific choices for compiler options and other options like memory maps/layouts) will be termed a "method". An application program typically consists of several different functions that are used to perform the activities an application program is to perform. If the method changes at the function level (from function to function), the term "solution" will be used to represent a specific assignment of methods to each function of the compiled application.

Each method of building an application can result in an executable version of the program application (version) that exhibits different results, such as, for example, code size and processor cycle count behavior. If an application is built using several different methods, each resulting version of the application can be profiled at the function level for its results over a consistent input set, for example, collecting compiled code size and execution cycles for the functions in the application program. The resulting set of profile information describes the effects that each method has on each profitable function; for the example previously employed, this is in terms of code size and number of cycles executed for each function of an application program.

A solution engine uses this profiling information to evaluate the permutations of varying methods at the function level to compute all of the useful solutions. A solution is "useful", if no other solution results in a version of the application that is better optimized for a specific result, such as, for example, either faster and smaller in code size than it.

What is needed is a user interface that can be used to display the set of useful solutions and allow a user to effectively understand, inspect, and manipulate result tradeoffs.

SUMMARY OF THE INVENTION

The present invention provides a user interface that allows a user to visually understand, inspect, and manipulate a set of useful solutions as a function of compiler options and other options, such as for example, but not limited to, code size and speed tradeoffs for an application program.

A user interface for displaying and controlling the results of compiling an application program with a compiler having a preselected number of compiling options, comprising of a module for displaying at least a portion of solution information as a function of said selected compiling options and for selecting at least one displayed solution, and a module for outputting, for a selected solution, compiler information to allow for said application program to be compiled in a manner consistent with said selected solution.

Other device, system and method forms of the invention are also disclosed and claimed herein. Other features of the invention are disclosed and still other features will be apparent from the disclosure herein.

BRIEF DESCRIPTION OF THE DRAWINGS

The novel features believed characteristic of the invention are set forth in the appended claims. The preferred embodiments of the invention as well as other features and advantages thereof will be best understood by reference to the detailed description which follows, read in conjunction with the accompanying drawings, wherein:

FIG. 3 depicts a point window.

FIG. 4 depicts an override window.

FIG. 5 depicts an extended solution point window.

Corresponding numerals and symbols in the different figures refer to corresponding parts unless otherwise indicated.

DETAILED DESCRIPTION

The present invention provides a user interface that allows a user to visually understand, inspect, and manipulate a set of useful solutions as a function of selected performance metrics. More particularly, the user interface of the present invention is preferably composed of four different modules or windows. These four modules are a solution space module, a solution point module, a solution point override module, and an extended solution point module. Each module is described below.

Although the examples hereinbelow refer to code size and speed of execution as selected performance metrics, other metrics may be selected in place of or in addition to these two exemplary metrics. Another metric may be for example, but not limited to, power consumed by a processor while executing the compiled application program.

Figure 1:
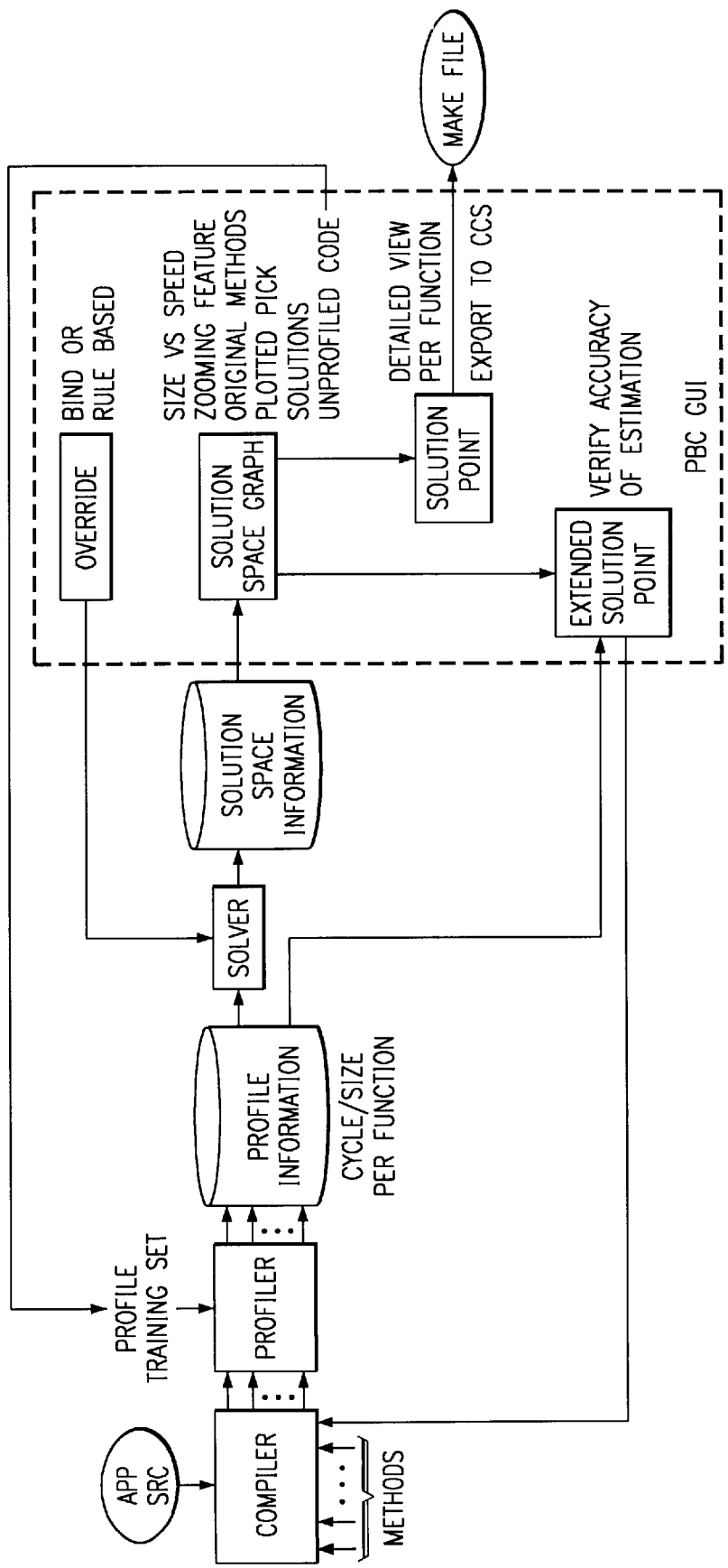
FIG. 1 depicts a pictorial diagram of the components for compiling an application program employing a user interface of the present invention.

The general process of profile-based optimization involves three tools: a compiler, a profiler, and a solution generator. FIG. 1 shows the complete compilation flow. A source program is fed to the compiler, using different optimization options each time, to generate several executables. Each executable is run through the profiler to generate a set of profile data for each executable. The profiler may be a stand-alone simulator that records run-time information. The solution generator or solver analyses all the profile data, guided by constraints supplied by the user, and generates compiler directives. A final compilation of the application program uses those directives to guide its optimizations and produces a profile—optimized executable, which should provide the best performance and size for the given constraints.

Profile data, collected by running the program and recording the time spent in each function, can indicate which parts of the program deserve more effort. The program must remain the same in all profile runs, and the profile runs must all do the same thing on all the same data.

Figure 2:
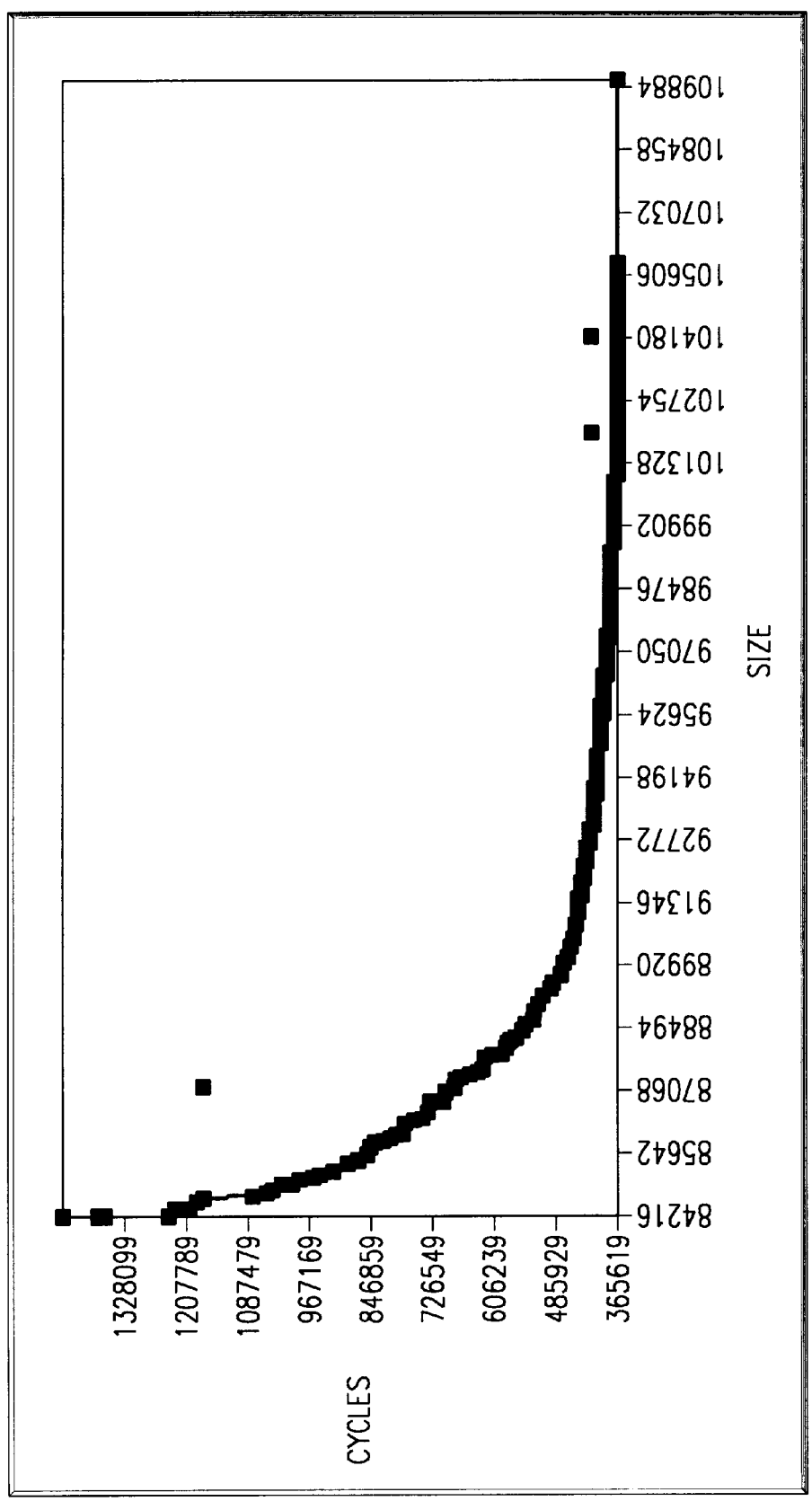
FIG. 2 depicts a typical solution curve.

Every individual function trade-off can be considered to produce a solution. If all possible permutations of trade-offs over the whole set of profile runs are saved, a set of solutions is created that can be plotted on a graph of size vs. speed, bytes vs. cycles. The lower contour of this set of points is the set of useful solutions—no other solutions are both faster and smaller—and defines the solution curve. This curve tends to be concave, not a straight line from fastest to smallest, and thus offers ample possibilities for improving size at little cost in speed, or vice versa. FIG. 2 shows a typical solution curve. The vertical scale is execution time of the program, in cycles. The horizontal scale is code size, in bytes. Each point represents a solution; the fastest one is at the lower right, the smallest at the upper left. This plot shows that the curve is concave, but also that it is not completely smooth. The concavity represents the advantage to be gained through profile-based optimization. The irregularity offers additional local opportunities. The user interface presents the entire graph to the user and allows the user to select the appropriate solution.

Thus, the initial steps for generating the information used by the user interface is providing said application program, and an associated database for exercising said program, providing a compiler, for compiling said application program, having compiling options, providing a profiler for extracting information related to said compiled application program from different compiling options, but using the same associated database, creating a profiler database based upon said extracted information, providing a solution solver for generating estimated solutions from said profiler database for points not provided by said extracted information, and creating a solution database based upon solutions from said solver on said extracted information and from extracted information.

The solution space module receives a list of useful solutions from a solution solver. Each solution contains a list of all profitable functions, and for each function, its resulting performance metric (such as code size and number of processor cycles) and what method of compiling the function was used to obtain those results. An overall performance for an application program is computed by summing up the performance of each function and then adding in any unprofiled performance. Unprofiled performance for a function may be estimated based upon the unprofiled performance of the original application executables initially profiled. The unprofiled performance of the original executables may differ slightly due to effects from alignment, for example, and in this case, the average is taken. The overall performance of each useful solution may then be graphed.

The main window of the solution space module of the user interface is the "solution space" window depicted in FIG. 2. It is presently preferred to be a 2 dimensional graph with the results for one performance metric option, such as a code size, increasing along the X axis and the results for a second performance metric, such as cycle count, increasing along the Y axis. Thus, for example, the upper left corner represents the smallest code size solution for an application and the lower right represents the fastest (fewest processor cycles) solution. Useful solutions are plotted in between and will form a solution space curve. Since it is a curve, plotting it and displaying the solution space curve allows the user to visualize and therefore understand what performance metric tradeoffs, such as code size and speed, are possible for that application.

Holding the mouse pointer over any solution point in the graph will display the exact code size and speed characteristics for that solution. The original versions of the application that were built to generate the profiling information may also be plotted, but in some unique representation, such as, in a different color. This helps the user understand the improvements that this process can bring to an application.

If the solution space contains many useful solutions, the curve will not look like a series of points, but rather like a continuous line. A zoom facility may be provided to allow the user to zoom in on an area of the curve of interest. This zoom facility allows the user to see the individual solution points.

A solution point may be selected by highlighting any plotted point with the cursor, using the mouse. Alternatively, the user can input a maximum cycle count or maximum code size, and the smallest or fastest, respectively, solution that meets that constraint will be chosen.

A solution point module is provided to allow for the presentation of a single solution point from the solver. Once a solution point is found that meets the user's code size and speed requirements, a module is provided to view the details of the selected solution point. The window for this module displays each function of the application along with its performance (code size and cycles) and the method used to build it, preferably in tabular form. The "solution point" window of FIG. 3 contains this information. For each function, there are columns for the function's size, cycle count, and method used to build the function. The data within each column can be sorted. This allows the user the flexibility to see what functions have the greatest cycle count or code size.

Once a solution point is selected, the solution point module also exports the necessary information to compile the application program to achieve the results similar to those of the selected solution, via a makefile, preferably on a function by function basis.

The override rule is useful if the profiling training set isn't perfectly representative and it is known that a particular function either is or is not speed critical. The binding of a method to function is useful if the function isn't invoked during profiling and so no cycle count information is available from which to choose the best method. FIG. 4 depicts one such screen.

The useful solutions set database generated by the solution engine are only estimations, based upon the profiling information obtained from the different versions of the application actually built. They are not actually built or profiled. Rather, it is assumed that each function will behave identically regardless of it surrounding code, and "projects" the performance of a solution point based upon the performance of each function from the profile information. This assumption isn't precisely correct because of alignment padding, NOPs between fetch packets, etc. Therefore, the solution points are estimates and can differ from the actual performance. The user interface of the present invention preferably allows the user the ability to actually build the solution point selected and compare actual results vs what was graphed. An "extended solution point" window depicted in FIG. 5 will compare the actual vs estimated performance. Optionally, it will also display a function table containing columns for actual code size, actual cycle counts, estimated code size, estimated cycle counts, delta code size (between actual and estimate) and delta cycle counts.

From the original methods used to build and profile the application, the solution solver obtains data on how each method affects the performance of each function. A solution point override module provides the user a way to display and control what method is employed on a function by function basis. When a method is bound to a function via a user selection, the override window removes from the solver's data all of the methods for that function except the bound one. Thus, the solver always chooses that one and only one method of building that function. When an override "rule" is applied to a function by a user, the override window does the same thing as above, but will reevaluate which method to keep each time the solver is invoked.

Flexibility is also provided by allowing the user to "override" the method used to build any function. The user may override a function by selecting a particular method that should always be used in building the function or by giving a rule that tells the solution engine how to pick the method. A typical rule is to pick the method of building the function that results in the fastest version or the smallest version. A rule is dynamically applied each time the solution solver engine is used and therefore can select a different method of building the function, if the profile data changes. The profile data is a set of inputs and conditions supplied to the application program to simulate its actual operation.

The extended solution point module takes the "makefile" generated by choosing a solution point and feeds it to the compiler to actually build the solution selected. The profiler then profiles the resulting executable, collecting the same profile information as for the original executables. It then presents an overall view and a function level view. The overall performance of the built solution is computed in the same manner as described in the solution space module. This overall performance result may be textually compared to the overall performance of the point chosen in a solution space module. In addition, each function may be listed and along with it, both the actual (profiled) and estimated (plotted) performance of that function listed in a tabular format, along with columns that contain the difference between the actual and estimated results.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A user interface for displaying and controlling the results of compiling an application program with a compiler having a preselected number of compiling options, the user interface comprising:

providing extracted solution points, as a function of selected compiling options used with an application compiled with said compiler, providing estimated solution points, as a function of selected compiling options used with an application compiled with said compiler, a module for displaying a multiplicity of solution points, including estimated and extracted solution points, as a function of selected compiling options, the user selecting at least one displayed solution point, and a module for outputting, for the selected solution point, compiler information to allow for the application program to be compiled in a manner consistent with the selected solution point.

2. A user interface for displaying and controlling the results of compiling an application program with a compiler having a preselected number of compiling options, the user interface, comprising:

a profiler for creating a profiler database, including extracted solution information, as a function of selected compiling options used with an application compiled with said compiler, a solution solver for generating estimated solution information from said profiler database, a module for displaying solution information as a function of selected performance metrics, the user selecting at least one displayed solution, and a module for outputting, for the selected solution, compiler information to allow for the application program to be compiled in a manner consistent with the selected solution.

3. The user interface as recited in claim 1, further comprising:

a module for selecting and fixing instructions for a provided solver that generates the provided extracted and estimated solution points.

4. The user interface as recited in claim 3, further comprising:

a module for compiling said application program in a manner consistent with said selected solution point compiler information and for comparing the complier results with the selected solution point results.

5. The user interface as recited in claim 1, wherein the module for displaying includes a user accessible module displaying details of each compiled program function for a user selected solution point.

6. The user interface as recited in claim 5, wherein the details include each function of the application along with selected performance metrics.

7. The user interface as recited in claim 1, wherein the module for displaying includes:

a compiler, the compiler providing solution point information using the application program, a database, and first compiling options; and a profiler, the profiler providing extracted solution points related to the compiled application program using said database and different compiling options.

8. The user interface as recited in claim 7, wherein a first compiling options and a second compiling options are selected based on performance metrics.

9. The user interface as recited in claim 2, wherein the module for displaying includes:

a compiler, the compiler providing solution point information using the application program, a database, and selected compiling options; and said profiler providing extracted solution points of information related to the compiled application program using the database and different compiling options.

10. The user interface as recited in claim 9, wherein a first compiling options and a second compiling options are based on the selected performance metrics.

* * * * *